April 26, 1966 G. JONSSON 3,247,542
MACHINE FOR CLEANING SHRIMP
Filed Feb. 7, 1964 9 Sheets-Sheet 1

INVENTOR.
Gregor Jonsson
BY
Olson, Trexler
Wolters & Bushnell
attys

INVENTOR.
Gregor Jonsson

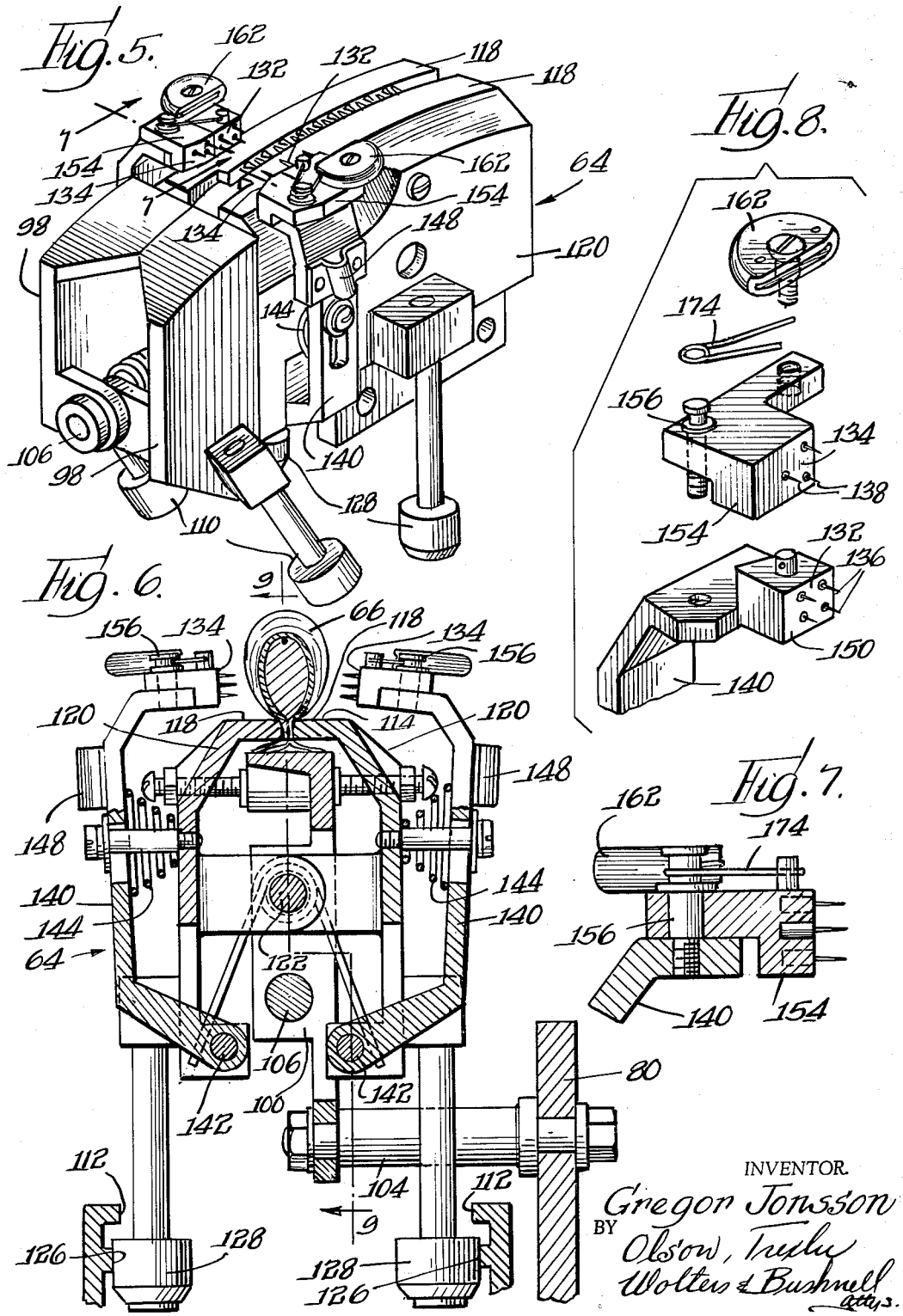

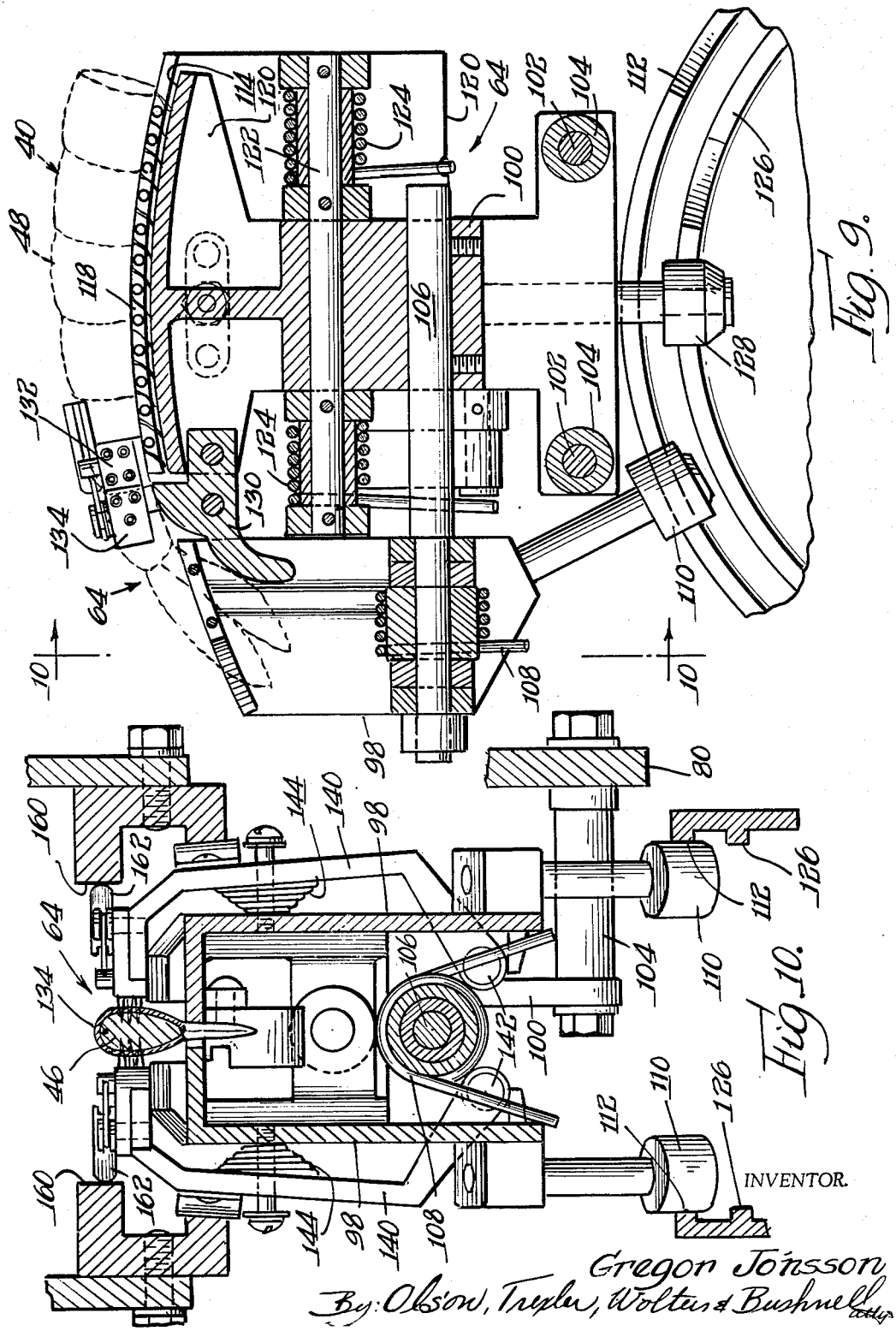

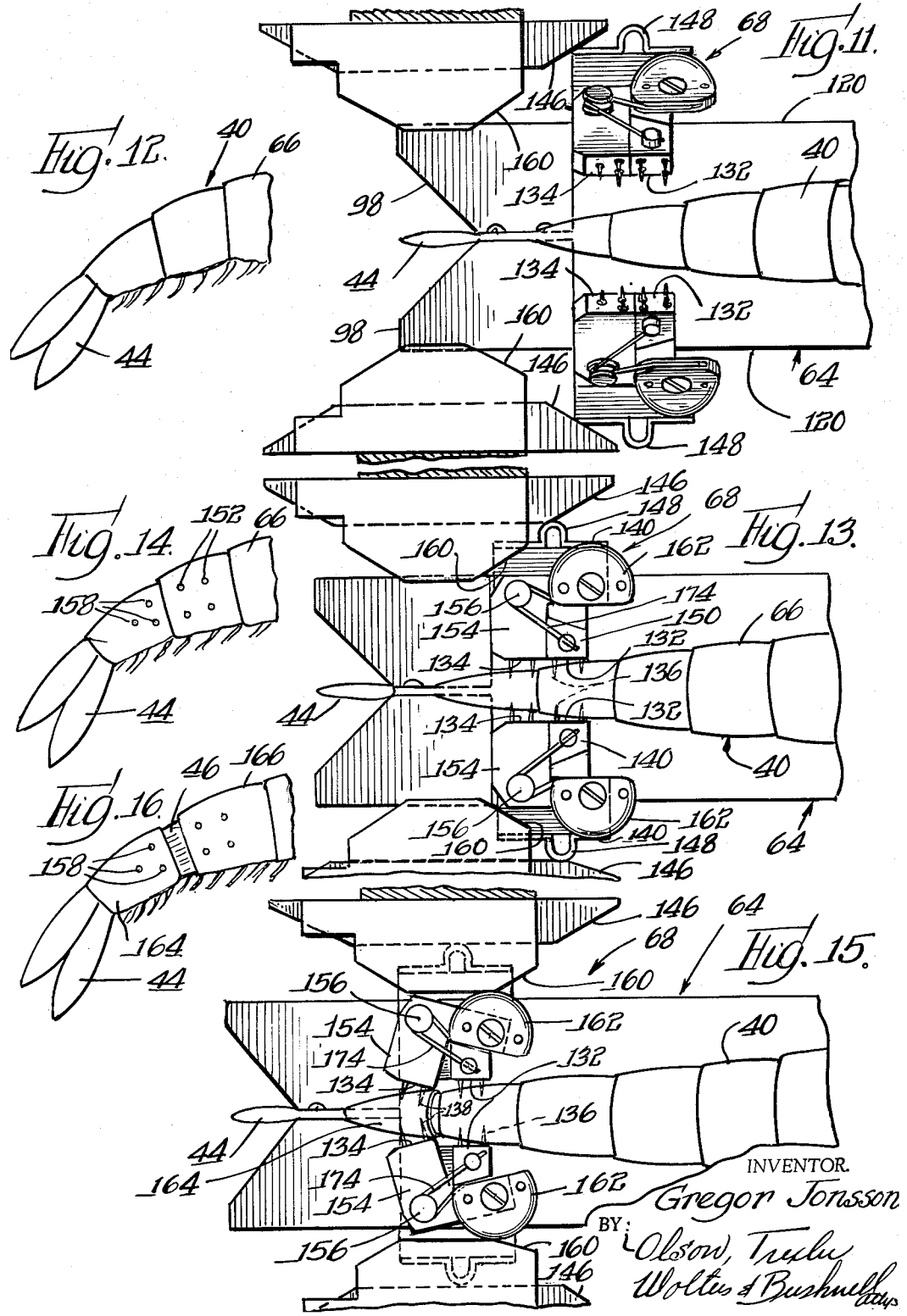

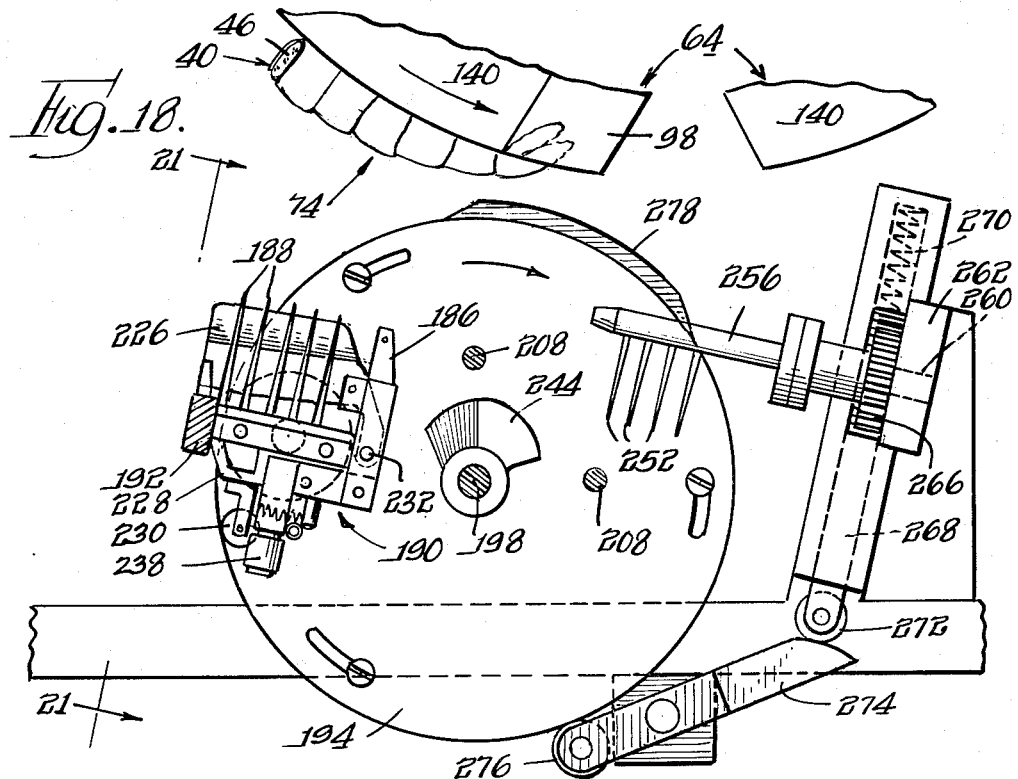
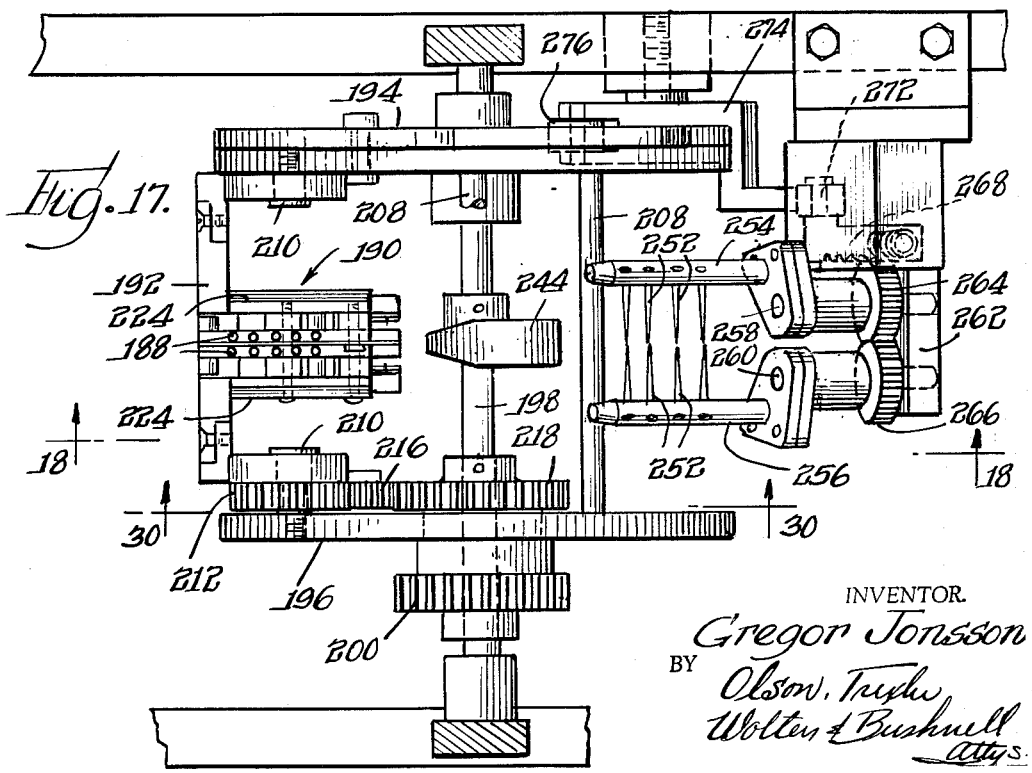

Inventor
Gregor Jonsson
By Olson, Trexler
Wolters & Bushnell attys.

April 26, 1966   G. JONSSON   3,247,542
MACHINE FOR CLEANING SHRIMP
Filed Feb. 7, 1964   9 Sheets-Sheet 8

INVENTOR.
Gregor Jonsson
BY
Olson, Trexler
Wolters & Bushnell
attys

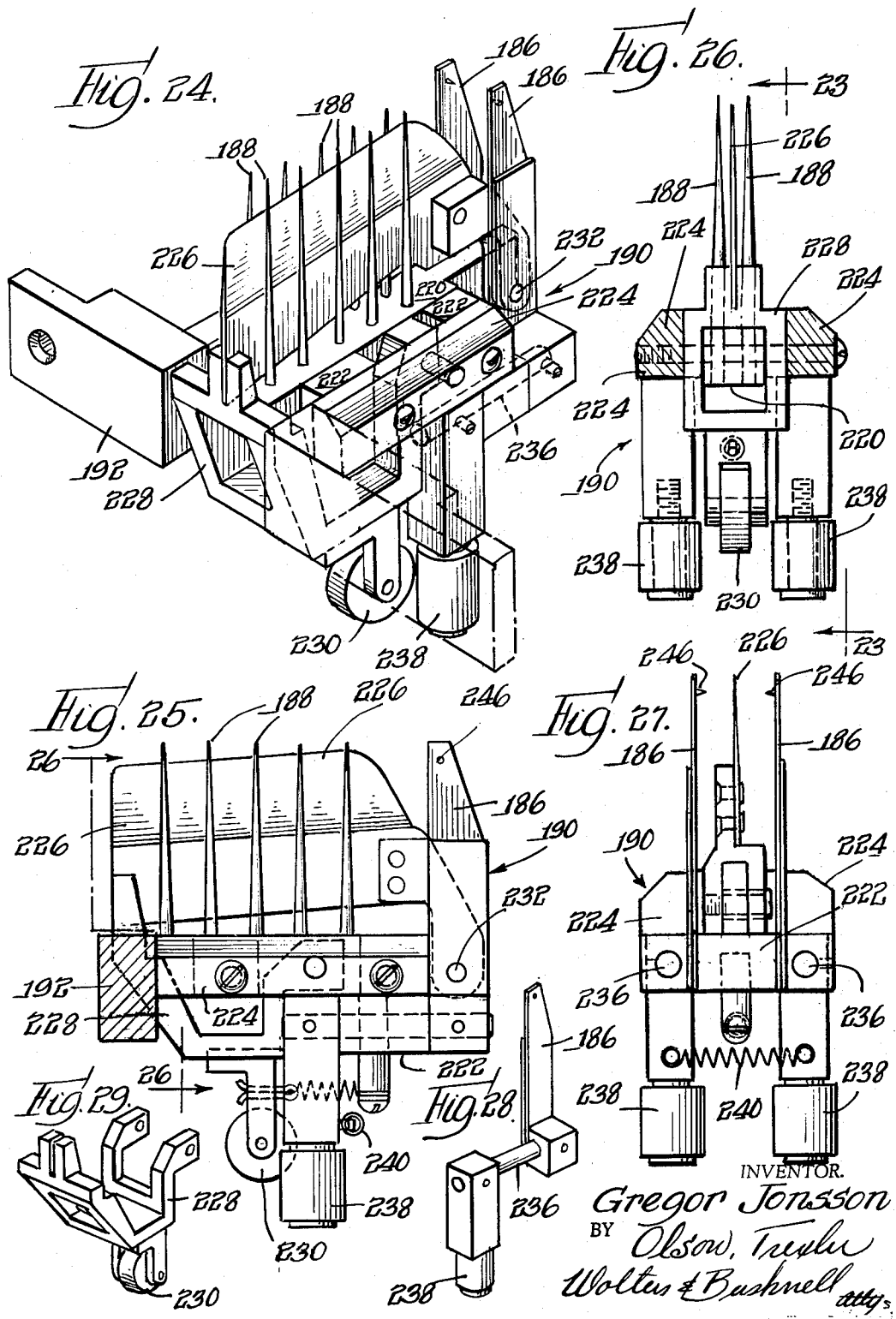

United States Patent Office 3,247,542
Patented Apr. 26, 1966

3,247,542
MACHINE FOR CLEANING SHRIMP
Gregor Jonsson, Lake Forest, Ill.
(1520 Berkeley Road, Highland Park, Ill.)
Filed Feb. 7, 1964, Ser. No. 343,292
10 Claims. (Cl. 17—2)

The present invention relates to the cleaning of shrimp and is concerned particularly with the cleaning of shrimp so as to leave the tail of each shrimp attached to the flesh body of the shrimp from which the shell is removed.

Cleaned shrimp consisting of flesh bodies of shrimp to which the shrimp tails remain attached and from which the sand veins and main portions of the shrimp shells have been removed may, for convenience, be referred to as cleaned "tail-on" shrimp. Such shrimp are preferred for some cooking and serving purposes and have certain qualities and advantages not afforded by cleaned shrimp from which the tails have been removed. For some purposes it is preferable to have shrimp consisting of cleaned flesh bodies of shrimp which have been deeply slit longitudinally and to which the shrimp tails remain attached. This type of "tail-on" shrimp will be referred to as "butterfly" shrimp.

The production of cleaned "tail-on" shrimp is complicated by the fact that the flesh bodies of raw shrimp have only very limited structural strength, the strength of each flesh body being weakest at the juncture of the shrimp tail with the flesh body. Moreover, this weakest portion of the flesh body, which must be relied on to hold the tail attached to the flesh body, is vulnerable to being damaged as an incident to separation of the shrimp tail from the main portion of the shrimp shell as is necessary in the production of "tail-on" shrimp. As a consequence, the tail of each shrimp is subject to being pulled loose from the flesh body of the shrimp, leaving the body tailless or with the tail so insecurely attached that the purpose of having "tail-on" shrimp is effectively diminished.

One object of the invention is to provide a new and highly advantageous machine for cleaning shrimp in accordance with the method recited in the preceding objects to provide cleaned "tail-on" shrimp or "butterfly" shrimp.

Another object of the invention is to provide a machine having a new and improved construction and mode of operation which operates to produce cleaned "tail-on" shrimp with assurance that the tails of the shrimp remain securely attached to the flesh bodies of the shrimp.

Another object of the invention is to provide an improved shrimp cleaning machine of the character recited which effects longitudinal slitting of shrimp in a new and improved manner to produce cleaned "butterfly" shrimp.

Another object of the invention is to provide a machine of the character recited which utilizes the full strength of the flesh body of individual shrimp in its substantially intact state in effecting separation of the tail of each shrimp from the shrimp shell, while at the same time operating to slit the flesh bodies of the shrimp longitudinally to produce "butterfly" shrimp.

Still another object is to provide a shrimp cleaning machine of the character recited in the preceding objects having a new and improved construction which enables the machine to operate with efficiency and dependability in cleaning shrimp in the manner recited.

Other objects and advantages will appear from the ensuing description of the invention taken in conjunction with the accompanying drawings, in which:

FIG. 5 is a perspective view, on an enlarged scale, of a typical shrimp holder incorporated in the machine;

FIG. 6 is a transverse sectional view on a still larger scale of a typical shrimp holder, taken with reference to the line 6—6 of FIG. 4;

FIG. 7 is a fragmentary sectional view on a substantially enlarged scale taken with reference to the line 7—7 of FIG. 5, and showing the structure of a shrimp shell clutch used in rupturing a shrimp shell;

FIG. 8 is an exploded view showing components of a typical shell rupturing jaw;

FIG. 9 is a longitudinal sectional view of a typical shrimp holder taken with reference to the line 9—9 of FIG. 6;

FIG. 10 is a transverse sectional view of a holder taken with reference to the line 10—10 of FIG. 9, and showing the position of the parts as the holder progresses through a shell rupturing station;

FIG. 11 is a fragmentary sectional view taken with reference to the line 11—11 of FIG. 4 and showing the relationship of the shell rupturing jaws of a typical holder to a shrimp in the holder before the jaws are engaged with the shrimp;

FIG. 12 is a fragmentary side view of the tail end of a shrimp as it is carried in a holder, as illustrated in FIG. 11;

FIG. 13 is a view similar to FIG. 11, but showing the shell clutches of the opposing jaws initially engaged with a shrimp shell;

FIG. 14 is a view similar to FIG. 12 but illustrating the points at which tines of the shell clutches initially engage the shrimp shell;

FIG. 15 is a view similar to FIG. 13 but showing a later phase in the movement of the holder in which the shrimp shell is overstretched to rupture the shell;

FIG. 16 is a view similar to FIG. 14 but illustrating the rupture of the shrimp shell by tension as effected in FIG. 15;

FIG. 17 is a sectional view on an enlarged scale of the machine, taken with reference to the line 17—17 of FIG. 4, and showing parts which cooperate with a shrimp holder to effect removal of the main portion of a shrimp shell;

FIG. 18 is a vertical sectional view taken with reference to the line 18—18 of FIG. 17;

FIG. 24 is a perspective view on an enlarged scale of the assembly which cooperates with a holder to effect removal of a shrimp shell and slitting of the shrimp body in the shell removing and body slitting station;

FIG. 25 is a side view of the assembly illustrated in FIG. 24;

FIG. 26 is a fragmentary sectional view taken generally with reference to the irregular line 26—26 of FIG. 25;

FIG. 27 is an end view of the assembly of FIG. 25;

FIG. 28 is a detail perspective view on a reduced scale of a tail engaging element of the assembly shown in FIG. 24;

FIG. 29 is a detail perspective view on a reduced scale of a slitting knife actuating lever incorporated in the assembly of FIG. 24.

Figure 1:
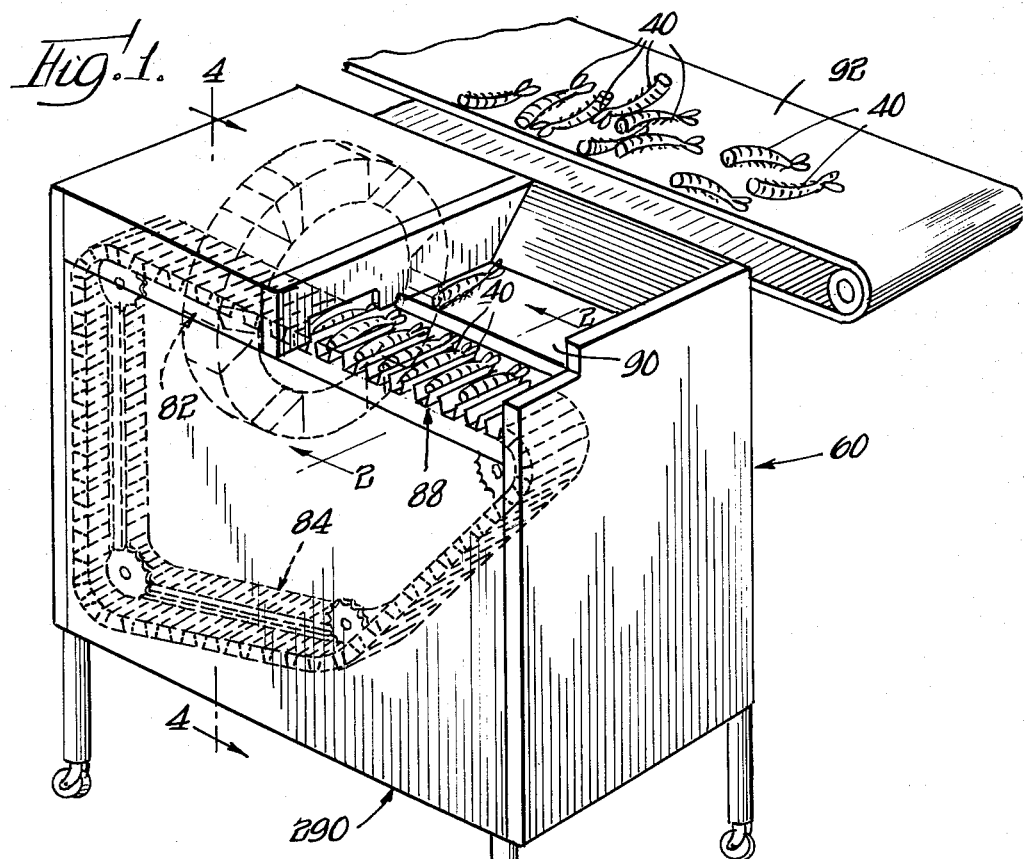
FIGURE 1 is a perspective view of a shrimp cleaning machine constructed in accordance with the invention.
Figure 2:
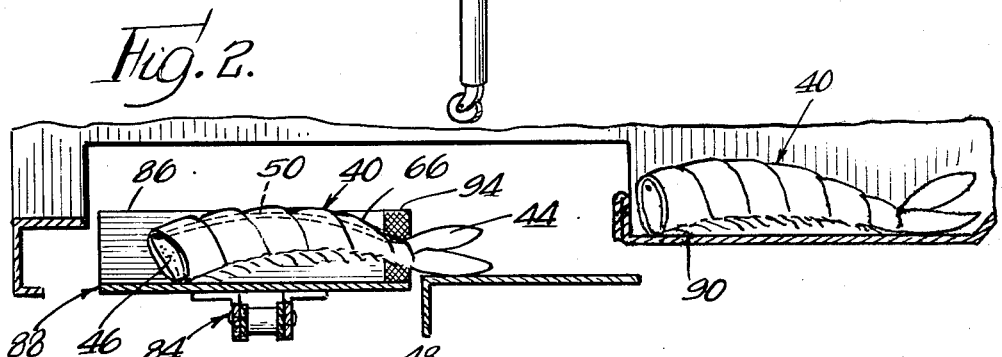
FIG. 2 is a fragmentary sectional view, on an enlarged scale, of the machine, taken along the line 2—2 of FIG. 1.

Referring to the drawings in greater detail, typical shrimp which are to be cleaned in accordance with the invention are shown in FIGS. 1 and 2 and identified by the reference number 40. The heads (not shown) of the shrimp are previously removed by means forming no part of the invention.

Figure 3:
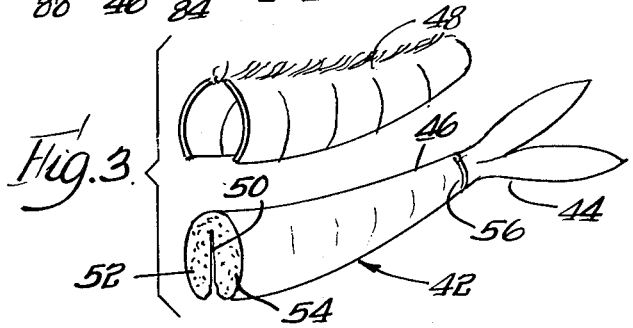
FIG. 3 is a perspective view showing a "butterfly" shrimp cleaned by the invention and showing the main portion of the shrimp shell which has been removed from the shrimp.

A typical "butterfly" shrimp 42 cleaned by the method and machine provided by the invention is illustrated in FIG. 3. As shown, the shrimp tail 44 remains attached to the flesh body 46 of the shrimp from which the main portion 48 of the shrimp shell is removed. See FIG. 3. The sand vein 50, FIG. 2, of the shrimp is removed from the flesh body 46 of the cleaned shrimp 42, the flesh body 46 of the "butterfly" shrimp shown having a deep longitudinal slit 58 which divides the flesh body 46 into two longitudinal half-sections 52, 54 which remain attached together along the ventral side of the shrimp, but which can spread apart or open up when the shrimp is prepared by cooking or serving.

The flesh body 46 of a typical shrimp inherently has only limited structural strength, the flesh body being at its weakest at the tail end which adjoins the shrimp tail 44. Moreover, a tail portion or segment 56 of the flesh body 46, where the tail 44 adjoins the flesh body is vulnerable to being damaged and further weakened as an incident to separation of the shrimp tail 44 from the main shell portion 48 which is removed from the flesh body.

Figures 4, 30:
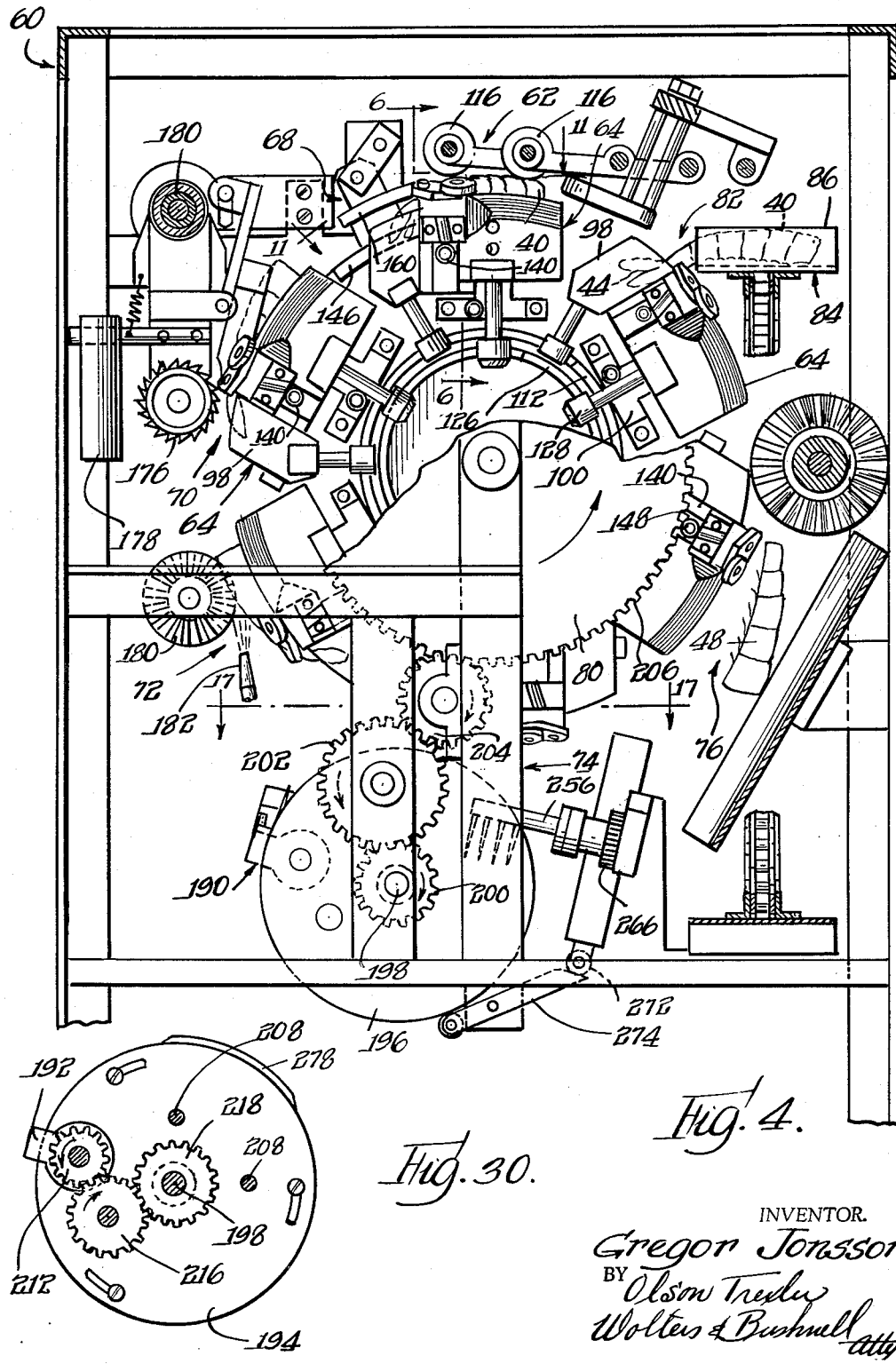
FIG. 4 is a transverse sectional view, on an enlarged scale, of the machine taken along the line 4—4 of FIG. 1, and showing a rotary assembly of shrimp holders which carry shrimp through a succession of stations where successive steps of the shrimp cleaning method are performed.
FIG. 30 is a fragmentary sectional view taken along the line 30—30 of FIG. 17 and showing gearing used in stabilizing the orientation of the assembly of FIG. 24.

The way in which shrimp are cleaned in the machine 60, FIG. 1, can be visualized most readily with reference to working zones, FIG. 4, in the machine 60.

First, a firm grip is established on the shell of each shrimp 40 to be cleaned. This is done in a shell gripping zone or station 62 in the machine 60 where the underbelly or ventral side of each shrimp is gripped in a shrimp holder 64, the grip on the shrimp shell extending along a major portion of the length of the shell.

The gripping of the shrimp 40 in the station 62 includes a gripping of the main shell portion 48 which is to be removed from the shrimp. As will appear, the grip on the main shell portion 48, once established in the station 62, is not released until the shell portion 48 is removed from the shrimp.

After a shrimp 40 is gripped in a holder 64, the shell of the shrimp is ruptured near the shrimp tail 44 as a prelude to subsequent separation of the shrimp tail from the main portion 48 of the shrimp shell. For convenience, the shrimp shell in its entirety will be identified by the number 66, FIGS. 2, 12 and 14. This rupturing of the shrimp shell 66 near the shrimp tail 44 is effected in a shell rupturing zone 68. Successive phases of the shell rupturing action effected in the zone 68 are illustrated in FIGS. 11 through 16. Rupturing of the shrimp shell 66 is accomplished by stretching the shell longitudinally sufficiently to break the strength of the shell adjacent the shrimp tail in a manner which avoids substantial weakening of the adjacent portion 56 of the flesh body which is subsequently relied on to hold the tail attached to the flesh body.

The shrimp shell 66 is slit and the body 46 of the shrimp is gashed longitudinally along the dorsal side of the shrimp in a station 70, FIG. 4, for removal of the shrimp sand vein 50, FIG. 2. Preferably, the gashed dorsal side of each shrimp is cleared of debris in a cleaning station 72.

The main shell portion 48 is removed from each shrimp in a shell removing station 74, wherein the main shell portion 48 of the shrimp is caused to move longitudinally over the head end of the flesh body 46. Thus, separation of the tail 48 from the main shell portion 48 is effected by longitudinal movement of the tail 44 away from the shell portion 48, in which action the shrimp body 46 is positioned to push the tail away from the main shell portion 48 to the end that separation of the tail 44 from the main shell portion 48 is effected without subjecting the tail segment 56 of the flesh body to tension forces which would tend to damage that portion of the flesh body which holds the tail attached to the flesh body.

When it is desirable to slit the flesh body 46 of the shrimp longitudinally to provide "butterfly" shrimp, longitudinal slitting of the flesh body is effected in the machine 60 in the shell removing station 74 contemporaneously with but preferably slightly subsequent to initial separation of the tail 44 from the main shell portion 48. Finally, the removed shell portion 48 is released at a shell releasing station 76.

In the machine 60 illustrated, a circular series of six shrimp holders 64 are mounted on a common rotor 80, FIGS. 4, 6 and 10, that is rotated to move the holders 64 in an endless circular path that carries the holders through the successive work stations or zones 62, 68, 70, 72, 74 and 76 previously referred to. Individual shrimp 40 are picked up or received by the individual holders 64 at a pickup or receiving station 82, FIG. 4, located between the shell releasing station 76 and the shell gripping station 62.

A progression of shrimp are moved into the pickup station 82 in synchronism with movement of the holders 64 into the pickup station 82 by an endless flexible conveyor 84 comprising a connected series of parallel trays 86, FIGS. 1, 2 and 4, each adapted to cradle an individual shrimp 40. A generally horizontal upper run 88 of the conveyor 84 passes alongside a fixed shrimp support board or tray 90 to the shrimp receiving station 82 which may be aptly characterized as a "feeding" station.

As shown, shrimp 40 are brought to the supply tray or board 90 by a supply conveyor 92. An operator (not shown) picks up shrimp 40 by hand from the support tray 90 and places the individual shrimp in successive trays 86 in the adjacent upper run 88 of the conveyer 84. The shrimp 40 are placed in the trays 88 so that the tails of all of the shrimp extend rearwardly and project a substantially uniform distance rearwardly from the rear end of the trays 86. Visible markings 94 in the rear portions of the trays 88 aid in manual placement of the shrimp in the trays 86 so that the tails 44 of the shrimp project the desired uniform distance rearwardly from the rear ends of the trays.

The endless conveyer 84 is intermittently advanced in synchronism with rotation of the holder bearing rotor 80 by means of a suitable common driving transmission for the rotor and conveyor, which can be readily provided by those skilled in the art. Rotor and conveyer drive means suitable for this purpose is disclosed in applicant's United States Patent No. 2,784,450, issued March 12, 1957.

Transfer of each shrimp from a conveyer tray 86 to a typical holder 64 in the pickup or feeding station 82 is effected by a pair of opposed tail clamping jaws 98 swingably mounted on the forward end of each typical holder 64.

As shown in FIGS. 4, 6, 9 and 10, each holder 64 has a central frame 100 which is supported on the rotor 80 by studs and sleeves 102, 104. The two tail clamping jaws 98 on each holder 64 are swingably mounted on the forwardly projecting end of a shaft 106 supported in the holder frame 100, FIG. 9. The tail clamping ends of the opposing jaws 98 are urged toward each other by the action of a spring 108 on the jaws, movement of the jaws 98 toward and away from each other being controlled by cam followers 110 mounted on the respective jaws 98 and coacting with tail jaw operating cams 112 as an incident to rotation of the rotor 80.

Opposing jaws 98 entering the shrimp receiving or feeding station 82 are held apart by the cams 112 to receive between the jaws the tail 44 of a shrimp 40 projecting rearwardly from an adjacent tray 86. The cams 112 are shaped to allow the jaws 98 to swing toward each other clamping the intervening shrimp tail 44 so that the shrimp is pulled from its tray 86 into overlying relation to an arcuate support surface 114, FIGS. 6 and 9 formed on the outer periphery of the holder frame 100. Movement of a holder 64 from the shrimp receiving or feeding station 82 into the shell clamping station 62 carries the shrimp, the tail of which is gripped by the jaws 98, into underlying relation to hold down rollers 116, FIG. 4, which force the ventral side of the shrimp firmly against the underlying support surface 114.

In the shell clamping station 62, the underbelly or ventral side of the shrimp shell is firmly gripped between arcuate shell gripping elements 118 formed by the outer ends of a pair of opposed shell gripping jaws 120 swingably mounted on a central shaft 122 carried by the holder frame 100. Two springs 124 act on the jaws 120 to urge the shell clamping elements 118 on the jaws toward each other, and opposed control cams 126 cooperate with followers 128 on the jaws 120 to control movement of the clamping elements 118 toward and away from each other, the cams 126 being shaped to cause movement of the shell clamping elements 118 toward each other by the springs 124 to clamp the underside of a shrimp shell in the shell clamping station or zone 62. The clamping elements 118 have sufficient arcuate extent away from the tail clamping jaws 98 to clamp the main shell segment 48, which is to be removed from the shrimp, along substantially the entire length of the shell segment 48. As shown in FIG. 9, the tail clamping jaws 98 and the adjacent end of the shrimp support surface 114 are separated by an intervening shrimp support element 130 underlying a short segment of the shrimp shell wherein rupturing of the shell is effected in the next working zone or station 68.

In the shell rupturing zone 68, to which each holder 64 moves after the main shell portion 48 is securely clamped in the station 62, the shell of each shrimp 40 is stretched beyond its breaking point by the action on the shrimp shell of two pairs of shell clutches 132, 134 carried by the holder 64 which bears the shrimp. Each of the clutches 132, 134 is designed to establish a non-slip connection with adjacent portions of a shrimp shell without applying to the shell pressure sufficient to cause significant damage or weakening of the flesh body 46 within the shell.

Preferably, each shell clutch 132 comprises four needle sharp tines 136, FIG. 8, and each clutch 134 comprises three needle sharp tines 138, the tines 136, 138 being adapted to slightly pierce and anchor the adjacent portions of a shrimp shell against slippage in relation to the respective clutches without applying damaging pressures to the shrimp shell.

The two pairs of shell clutches 132, 134 on each holder 64 are carried by a pair of shell rupturing jaws 140 swingably mounted on two lower pivots 142 carried by the holder frame 100, as shown in FIGS. 6 and 10. One clutch of each pair of clutches 132, 134 is supported on the upper end of each jaw 140.

Compression springs 144 urge the jaws 140 away from each other to normal positions in which the clutches 132, 134 are spaced from a shrimp 40 gripped in the holder 64, as shown in FIG. 6.

As each holder 64 moves into the shell rupturing station or zone 68, a pair of opposed cams 146 engage cam followers 148 on the jaws 140, FIG. 11, and swing the jaws toward each other to engage the clutches 132, 134 with adjacent portions of the shrimp shell 66 intervening between the clutches, as shown in FIG. 13.

As shown in FIGS. 8 and 13, the tines 136 of each clutch 132 are set in a square pattern in a supporting element 150 on the corresponding jaw 140 which confronts the adjacent shrimp shell 66 upon swinging of the jaws 140 toward each other. Thus mounted, the four tines 136 of each clutch 132 slightly pierce and effectively anchor an adjacent segment of the shrimp shell, as indicated by the four pierce marks 152 in FIG. 14.

The three tines 138 of each clutch 134 are set in a portion of a supporting bell-crank 154 supported by a pivot 156, FIGS. 7, 8 and 13, on the corresponding jaw 140 to confront the adjacent shrimp shell 66 upon swinging of the jaws 140 toward each other, FIG. 13.

As shown in FIGS. 11, 13 and 15, the pair of clutches 134 are positioned to engage the shell of an intervening shrimp between the pair of clutches 132 and the tail 44 of the shrimp. The three tines 138 of each clutch 134 are arranged in a triangular pattern and slightly penetrate the segment of the shrimp shell 66 which is immediately adjacent the tail 44 of the shrimp, the three pierce marks of the tines 138 of each clutch 134 being identified in FIGS. 14 and 16 by the number 158. It will be noted with reference to FIG. 13 that the pivots 156 are located forwardly of the centers of the clutches 134, with reference to the direction of movement of the corresponding holder 64, so that the reaction of the shrimp shell on the clutches 134 tends to swing the ends of the levers 154 bearing the clutches 134 against the rigid parts 150 of the jaws 140, thereby solidly supporting the levers 154 on the jaws 140 as the jaws are swung toward each other to engage all of the clutches with a shrimp shell, as shown in FIG. 13.

As movement of the holder 64 continues, two cams 160 engage cam followers 162 on the two bell-cranks or levers 154, FIGS. 10 and 13, to swing the levers 154 about the pivots 156 in directions which move the clutches 134 away from the clutches 132 toward the adjacent shrimp tail 44, as shown in FIG. 15.

This movement of the pair of clutches 134 away from the pair of clutches 132 moves a tail adjoining segment 164 of the shrimp shell away from the adjacent segment of the shrimp shell 66, which is effectively anchored by the clutches 132. This action tensions and overstretches the shell 66 between the clutches 132 and 134 to effect rupturing of the shell between the clutches 134 and 132. The flesh body 46 of the shrimp is more elastic than the shrimp shell 66 and is not significantly weakened by the stretching action which ruptures the shell.

Continued movement of the holder 64 carries the holder beyond the cams 146, 160, whereupon the clutches 132, 134 are disengaged from the shrimp by the springs 144. The bell-cranks 154 are returned to their normal positions by springs 174, FIGS. 7, 8, 13 and 15.

Each holder 64 carries its shrimp from the shell rupturing zone 68 through the deveining zone 70 where a rotating saw 176 biased into the shrimp by a weight 178 slits open the shell 66 of the shrimp to expose the shrimp body 46 and remove the sand vein 50.

From the station 70, each shrimp 40 is carried by its holder 66 to the cleaning zone 72 where debris is removed from the open dorsal side of the shrimp by a rotating brush 180 assisted by a jet of water from a nozzle 182.

Figure 19:
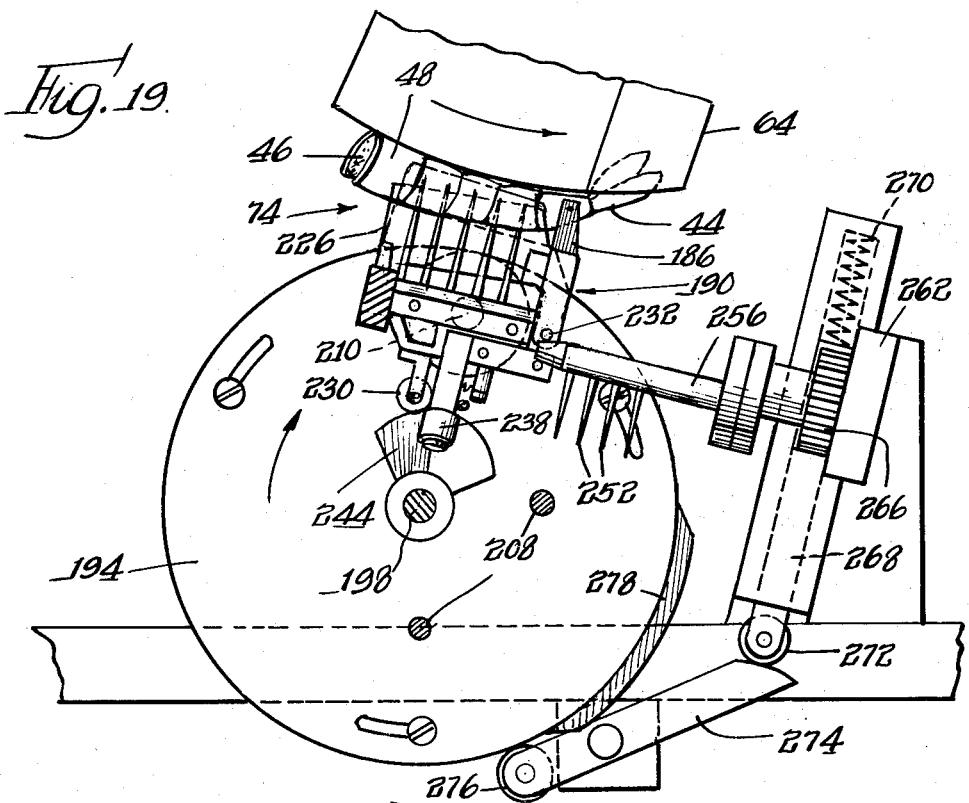
FIG. 19 is a vertical sectional view similar to FIG. 18, but showing a later phase in the movement of shrimp body and tail engaging structure in relation to a shrimp carried by a holder into the shell removing and body slitting station.
Figure 20:
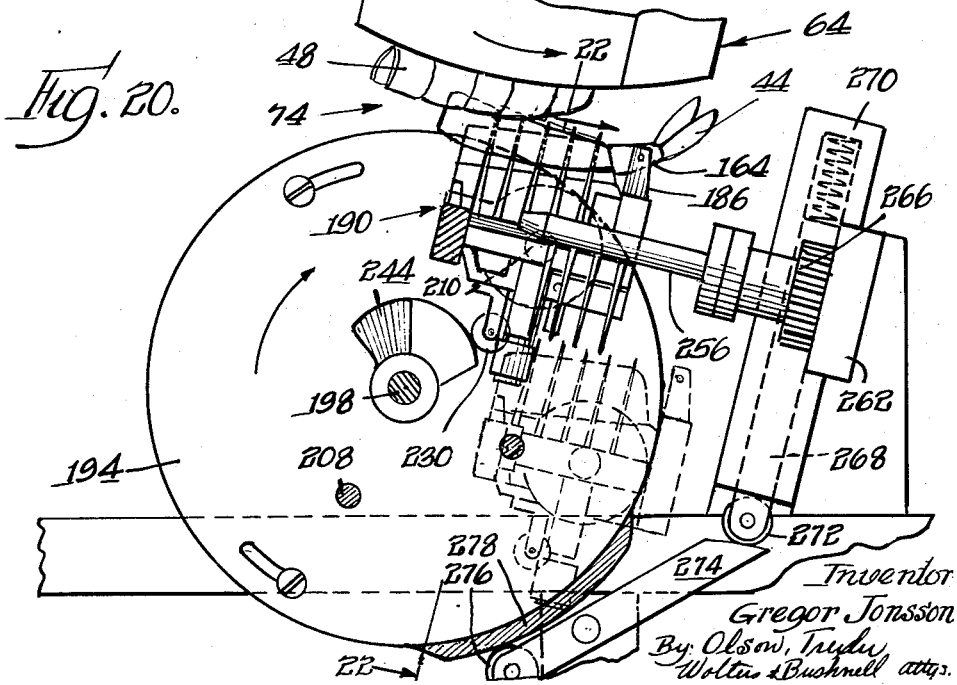
FIG. 20 is a view similar to FIG. 19 but illustrating a slightly later phase in the relative movement of parts in the shell removing and body slitting station.
Figure 21:
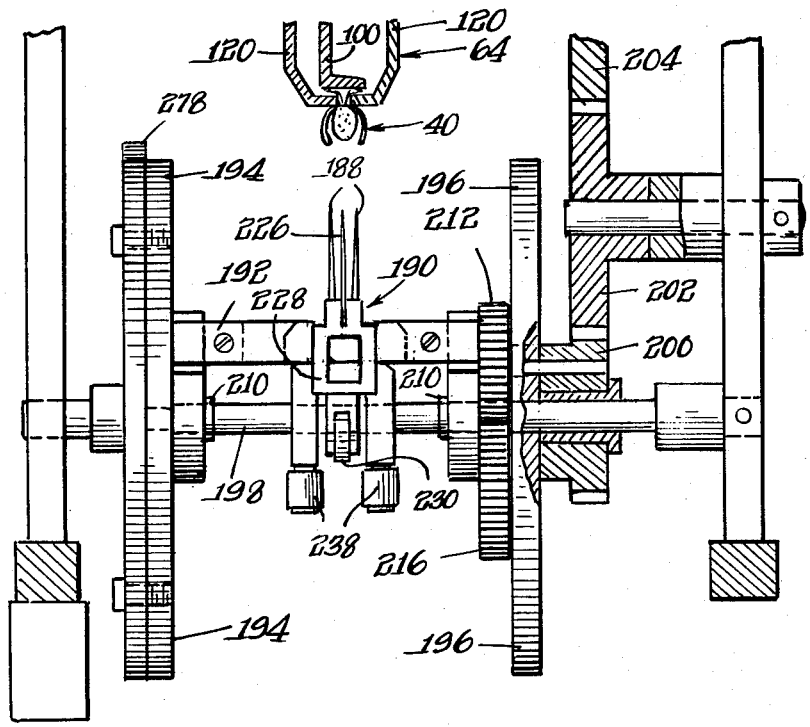
FIG. 21 is a fragmentary transverse section view taken with reference to the line 21—21 of FIG. 18.

Continued movement of the corresponding holder 64 carries scrubbed shrimp from the station 72 to the station 74, FIG. 4, wherein the flesh body 46 and tail 44, FIGS. 18, 19 and 20 are moved longitudinally in relation to the main shell portion 48, thereby effecting longitudinal movement of the main shell portion 48 away from the shrimp tail 44 and over the head end of the flesh body 46. This action is effected even though tail first longitudinal movement of the gripped shell portion 48 is continued without interruption through the station 74 by the corresponding holder 64.

As each holder 64 approaches the shell removing station 74, the tail clamping jaws 98 on the holder are opened by the action of the cams 112 to release the shrimp tail 44.

As each shrimp is carried by its holder 64 into the station 74 the tail 44 of the shrimp is grasped between two tail holding blades 186, and the flesh body 46 of the shrimp is pierced by two rows of body piercing tines 188 carried by and forming parts of a shrimp tail and flesh body accelerating assembly or unit 190, FIGS. 17 through 29.

The assembly 190 is caused to orbit in a substantially circular path, while at the same time being established in a predetermined, fixed orientation in relation to a horizontal plane, the path and speed of movement of the assembly 190 being determined so as to bring about the desired coaction of the assembly with each shrimp moved into the station 74 and the desired relative speed of the assembly 190 in relation to successive holders 64 moving through the station 74.

As shown in FIGS. 17 to 21, the assembly 190 is carried by a frame 192 extending between two spaced parallel support discs 194, 196 that are rotated in synchronism with the rotor 80, FIG. 4. The discs 194, 196 are journalled on a stationary support shaft 198 parallel to the axis of the rotor 80. Rotation of the two discs 194, 196 is effected by a gear 200, FIGS. 4 and 17, on the disc 196, which is connected through two idler gears 202, 204 with a bull gear 206 on the rotor 80. The two discs 194, 196 are tied together by a plurality of bars 208 to form a rigid rotary carrier for the assembly 190.

Opposite ends of the frame 192, which supports the assembly 190, are rotatably supported on two axle studs 210 threaded into the respective discs 194, 196, the axle studs 210 being radially spaced from the axis of the discs 194, 196 so that rotation of the discs 194, 196 causes the assembly 190 supported between the discs to orbit in a generally circular path.

As the assembly 190 is orbited upon rotation of the discs 194, 196, the assembly 190 is prevented from turning so that its angular orientation in relation to a horizontal plane does not change. This is effected by means of a gear 212, FIGS. 17 and 30, fixed to one end of the assembly frame 192 and meshing with an idler gear 214, journalled on the disc 196, which in turn meshes with a stationary gear 218 supported on the shaft 198.

The central portion of the frame 192 for the assembly 190 comprises a central frame member 220, connected through a plurality of spacers 222 to two stud frame members 224, FIGS. 24 to 27. The central frame member 220 serves as a support base for the two previously mentioned rows of shrimp body piercing tines 188 which extend upwardly and have considerable length, as shown.

A shrimp body slitting knife 226, located between the rows of tines 188, as shown in FIGS. 24 to 26, is hinged on the end of the central frame member 220 adjacent the tail holding blades 186 for swinging movement parallel to the tines 188.

Outward swinging movement of the body slitting knife 226 is effected by a lever 228, FIGS. 24, 25 and 28, carrying a cam follower roller 230 and being pivotally supported between the frame members 224, as shown, to slidably support and act on the end of the knife 226 opposite from the hinge axis 232, FIG. 25, about which the knife 226 swings.

The previously mentioned tail holding blades 186 project outwardly in generally parallel relation to the tines 188 and are located somewhat beyond the tines, as shown in FIGS. 24 and 25, to embrace the tail 44 of a shrimp, the flesh body of which is pierced by the tines 188, as will presently appear. The two blades 186 are supported for swinging movement toward and away from each other by two shafts 236 journalled in the outer frame members 224 and carrying two depending cam followers 238. A spring 240, FIG. 27, connected between the cam followers 238, urges the blades 184 into spaced relation to each other to receive a shrimp tail 44 therebetween.

The dimensions of the parts and the synchronization of the movements of the parts are such that the assembly 190 moves through the station 74 in synchronism with movement of each successive holder 64 through the station 74, FIGS. 18 to 20. The orbital path of the tines 188 overlaps the path of the flesh body 46 of a shrimp carried into the station 74 by a typical holder 64, with the result that the two rows of tines 188 impale the flesh body 46 which has been exposed along its dorsal side by slitting in the station 70. At the same time, the two tail holding blades 186 are brought into embracing relation to the shrimp tail 44, FIG. 19. Concurrently with this, the two cam followers 238 move into straddling relation to a stationary wedge shaped cam 244 which moves the followers 238 away from each other, causing the blades 186 to grasp the shrimp at the tail.

More particularly, the blades 186 grasp the shrimp at the juncture of the tail 44 with the very short segment 164 of the shrimp shell which remains attached to the tail and flesh body. See FIG. 16. Sharp protuberances 246 on the free ends of the blades 186 aid in establishing non-slip engagement of the blades with the shrimp.

The previously described gear drive for the rotary discs 194, 196 is such that the movement of the tines 188 and blades 186 in the zone 74 is generally in the same direction as the movement of the main shrimp shell portion 48 gripped in an adjacent holder 64, but is at a higher rate of speed.

Because of their higher speed in relation to an adjacent holder 64, the blades 186 and tines 188, after embracing a shrimp tail and piercing a shrimp body 46 in the station 74, move longitudinally relative to the shrimp in the direction of the shrimp tail, thus causing release of the main shell segment 48 from the tail and flesh body by movement of the shell segment 48 over the head end of the flesh body, as shown in FIG. 20. It will be noted that the flesh body 46 is intact and is positioned as a pusher behind the tail 44.

Just as the main shell portion 48 is released from the shrimp tail and body, the outer periphery of the stationary cam 244 acts on the cam follower 230 to force the knife 226 outwardly to quickly slit the flesh body 46 longitudinally, to produce a "butterfly" shrimp.

Continued movement of the orbiting assembly 190 carries the cleaned flesh body and tail of the shrimp away from the main shell segment 48 into a position between two linear rows of stripper tines 250, 252 carried by two cantilevering bars 254, 256 eccentrically mounted on two support shafts 258, 260 journalled in a common support 262 and connected together by two gears 264, 266 to rotate simultaneously in opposite directions. A rack 268 biased downwardly by a spring 270 meshes with the gear 264, FIGS. 17, 18, 22 and 23, and carries at one end a roller 272 that engages one end of a medially pivoted lever 274, the other end of which carries a cam follower roller 276 in engagement with the disc 194, FIG. 18.

An arcuate cam 278 on the disc 194 is positioned circumferentially to act on the roller 276 and operate through the mechanism just described to swing the cantilever bars 254, 256 and stripper tines 250, 252 apart upon the approach of the assembly 190 to permit passage between the stripper tines 250, 252 of the lower portion of the assembly 190 as it orbits in its path. At this time, the followers 238 have passed beyond the cam 244 and the blades 186 have swung away from the shrimp, leaving the shrimp supported on the tines 188 which impale the shrimp body.

Figures 22, 23:
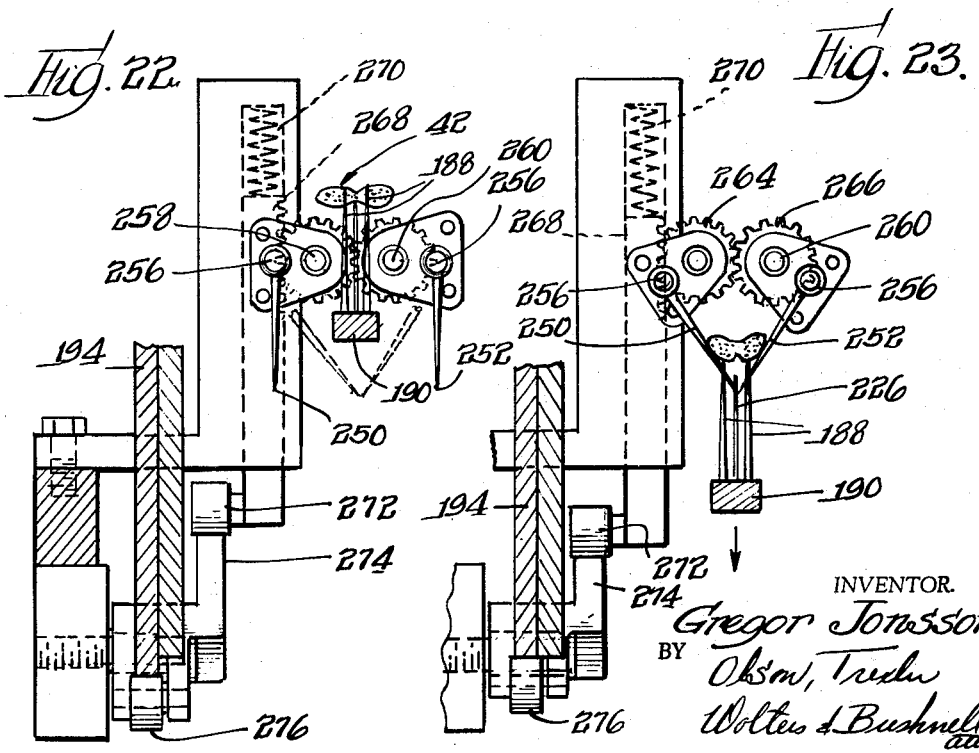
FIG. 22 is a fragmentary vertical sectional view taken with reference to the line 22—22 of FIG. 20, and showing shrimp stripper parts opened to permit passage of shrimp bearing elements.
FIG. 23 is a figure similar to FIG. 22, but illustrating a later phase in the action in which stripper splines are swung toward each other to remove a cleaned shrimp from impaling tines.

The retracted position of the stripper tines 250, 252 which allows passage of the lower portion of the assembly 190 is illustrated in solid lines in FIG. 22. As movement of the assembly 190 between the stripper tines 250, 252 progresses, the follower roller 276 moves off the cam 278, allowing the spring 270 to swing the stripper tines 250, 252 toward each other to intervene between the impaling tines 188 to cradle the cleaned shrimp 42 and strip it from the impaling tines 188 as movement of the assembly 190 continues. Upon subsequent movement of the stripper tines 250, 252 away from each other, the cleaned shrimp 42 drops into an underlying receiver (not shown).

The main shell portion 48 of the shrimp is released from its holder 64 in the station 76 by movement of the main gripper jaws 120 away from each other by the cams 126.

The machine structure thus described is supported by a suitable frame and housing identified generally by the number 290, FIG. 1.

It will be appreciated that the invention is not necessarily limited to use of the particular machine structure illustrated and described, but includes the use of equivalents and alternatives within the spirit and scope of the invention as defined by the claims.

The invention is claimed is follows:

1. A machine for cleaning shrimp comprising, in combination, a plurality of shrimp holders, means for moving said holders through a predetermined endless path which extends past a shell removing zone, each of said holders including means for gripping the main portion of the shell of a shrimp to carry the shrimp tail first along said path, means for rupturing the shells of shrimp carried by said respective holders near the tails of the respective shrimp, means for opening longitudinally the shells of shrimp carried by said respective holders, flesh body and tail displacing means, support means supporting said flesh body and tail displacing means for movement along a predetermined path which extends through said shell removing zone in a direction generally paralleling within said zone the direction of movement through said shell removing zone of said respective holders, and drive means synchronized with movement of said holders and coacting with said flesh body and tail displacing means to move the latter along said path thereof in synchronism with movement of said holders to engage said flesh body and tail displacing means with the flesh body of a shrimp moved by an individual holder into said shell removing zone and to continue movement of said displacing means in said zone in the same general direction as the adjacent holder moves in said zone but at a higher speed so that said flesh body and tail displacing means displaces the flesh body and tail of the engaged shrimp in relation to the shell of the shrimp longitudinally from the head end toward the tail end of the shrimp shell to release the flesh body and tail of the shrimp from the main portion of the shrimp shell that is gripped in the adjacent holder.

2. A machine for cleaning shrimp comprising, in combination, a plurality of shrimp holders, means for moving said holders through a predetermined endless path which extends past a shell removing zone, each of said holders including means for gripping the main portion of the shell of a shrimp to carry the shrimp tail first along said path, means for rupturing the shells of shrimp carried by said respective holders near the tails of the respective shrimp, means for opening longitudinally the shells of shrimp carried by said respective holders, a flesh body and tail displacing assembly including a plurality of flesh body impaling tines and opposed tail holding elements, support means supporting said flesh body and tail displacing assembly for movement along a predetermined path which extends through said shell removing zone in a direction generally paralleling within said zone the direction of movement through said zone of said respective holders, drive means synchronized with movement of said holders and coacting with said flesh body and tail displacing assembly to move the latter in synchronism with movement of said holders to impale with said tines the flesh body of a shrimp moved by one of said holders into said shell removing zone, operating means coacting with said tail holding elements to move the latter toward each other as an incident to movement of said displacing means into said shell removing zone to grasp the shrimp tail attached to the flesh body impaled by said tines in said zone, and said drive means having an output motion which is coordinated with the motion of said holders to move the displacing means through said shell removing zone in the same general direction as the adjacent holder moves in said zone but at a higher speed so that the flesh body and tail of a shrimp impaled by the tines and grasped by the tail holding elements is displaced relative to the main portion of the shrimp shell longitudinally from the head end toward the tail end of the shrimp shell to release the flesh body and tail of the shrimp from the main portion of the shrimp shell that is gripped in the adjacent holder.

3. In a shrimp cleaning machine, the combination of a plurality of shrimp holders movable through a predetermined path extending through a shell removing zone, means for supplying shrimp to said holders at a location along said path that is spaced from said shell removing zone, each of said holders including means for gripping the ventral side of the shell of a shrimp loaded into the holder to carry the shrimp tail first along said path, means on each holder for rupturing the shell of a shrimp carried by the holder at a position adjacent the tail of the shrimp, means for opening the shells of shrimp carried by said respective holders longitudinally along the dorsal sides of the shrimp, flesh body and tail displacing means mounted for movement along a predetermined path which extends through said shell removing zone and which generally parallels within said zone movement of individual holders within said zone, drive means synchronized with movement of said holders and coacting with said flesh body and tail displacing means to move the latter into said zone in synchronism with movement of an individual holder into said zone to engage said displacing means with the flesh body of a shrimp carried into said zone by the holder, and said drive means having an effective output velocity which is coordinated with the velocity of said holders so that said displacing means is moved through said zone in the same general direction as a coacting holder is moved through said zone but at a higher speed so that the flesh body of a shrimp engaged by said displacing means in said zone is released from the main portion of the shrimp shell gripped by the adjacent holder by longitudinal movement of the flesh body and tail of the shrimp in relation to the shrimp shell longitudinally toward the tail end of the shrimp shell so that the main portion of the shrimp shell carried in the adjacent holder is displaced over the head end of the flesh body.

4. In a machine for cleaning shrimp, the combination of a holder movable along a predetermined path extending through a shell removing zone, said holder including means for gripping a shrimp along the ventral side of the main portion of the shrimp shell to carry the shrimp along said path, means for rupturing the shell of a shrimp carried by said holder at a position near the tail of the shrimp, means for cutting open longitudinally the main portion of the shell of a shrimp carried by said holder, a flesh body displacing assembly, operating means synchronized with movement of said holder and coacting with said displacing assembly for moving said displacing assembly into engagement with the flesh body of a shrimp carried into said shell removing zone by said holder, said operating means being coordinated with said holder to effect in said zone movement of said displacing means relative to said holder, which relative movement has with respect to the position of a shrimp carried by the holder a longitudinal direction directed from the head end toward the tail end of said shrimp position, to effect release of the flesh body and tail of the shrimp from the main shell portion carried by the holder, a flesh body slitting knife carried by said displacing assembly, and means for operating said knife to slit the flesh body of a shrimp engaged by the displacing assembly within said zone in timed relation to releasing of said flesh body and tail from the main shell portion by said relative movement of said releasing assembly in relation to said holder in said shell removing zone.

5. In a machine for cleaning shrimp, the combination of a plurality of shrimp holders, means for moving said holders through a predetermined endless path which extends past a shell removing zone, each of said holders including means for gripping the main portion of the shell of a shrimp to carry the shrimp tail first along said path, means for opening longitudinally the shells of shrimp carried by said holders, a flesh body and tail displacing assembly including a plurality of flesh body impaling tines and opposed tail holding elements, rotary support means supporting said flesh body and tail displacing assembly for movement along a circular path which extends through said shell removing zone in a direction within said zone generally paralleling movement through said zone of said respective holders, stabilizing means coacting with said displacing assembly to maintain said impaling tines thereof substantially in a predetermined angular orientation thereof with reference to the horizontal as the displacing assembly is moved along said circular path thereof, drive means synchronized with movement of said holders and connected to rotate said rotary support means to move said displacing assembly through said zone in the same direction in which said holders move through said zone and in synchronism with movement of an individual holder through said zone to impale with said tines the flesh body of a shrimp moved by an individual holder into said zone, operating means coacting with said tail holding elements to effect relative movement of the latter toward each other as an incident to movement of said displacing means into said shell removing zone to grasp the shrimp tail attached to the flesh body impaled by said tines in said zone; said drive means having an effective output speed in relation to the speed of said holders which moves the displacing assembly through said removing zone at a speed higher than that at which a coacting holder moves through said zone so that the flesh body and tail of a shrimp impaled by the tines and grasped by the tail holding elements of said displacing assembly in said zone is displaced, relative to the main portion of the shrimp shell which is gripped in a coacting holder, longitudinally from the head end toward the tail end of the shrimp shell to release the flesh body and tail of the shrimp from the main portion of the shrimp shell; and stripper means operated in synchronism with said rotary support means to remove from said impaling tines the tails and flesh bodies of shrimp released from the main portions of shrimp shells in said zone.

6. In a shrimp cleaning machine, the combination of a plurality of shrimp holders movable through a predetermined path extending through a shell removing zone, means for supplying shrimp to a supply station along said path that is spaced from said shell removing zone, each of said holders including a pair of opposed tail gripping elements, means for effecting movement of the tail gripping elements of each holder toward each other to grip the tail of a shrimp as the holder moves through said supply station whereby the shrimp is pulled tail first onto the holder, each of said holders including means for gripping the main portion of the shell of a shrimp which is pulled onto the holder by said tail gripping elements thereof, means on each holder for longitudinally tensioning the shell of a shrimp carried by the holder to break the strength of the shrimp shell at a position adjacent the tail of the shrimp, means for opening longitudinally the main portions of the shells of shrimp carried by said respective holders, flesh body and tail displacing means mounted for movement along a predetermined path which extends through said shell removing zone and which generally parallels within said zone movement of individual holders within said zone, drive means synchronized with movement of said holders and coacting with said flesh body and tail displacing means to move the latter into said zone in synchronism with movement of an individual holder into said zone to engage said displacing means with the flesh body of a shrimp carried into said zone by the holder, and said drive means having an effective output velocity which is coordinated with the velocity of said holders so that said displacing means is moved through said zone in the same general direction as a coacting holder is moved through said zone but at a higher speed so that the flesh body of a shrimp engaged by said displacing means in said zone is released from the main portion of the shrimp shell gripped by the adjacent holder by longitudinal movement of the flesh body and tail of the shrimp in relation to the shrimp shell longitudinally toward the tail end of the shrimp shell so that the main portion of the shrimp shell carried in the adjacent holder is displaced over the head end of the flesh body.

7. In a shrimp cleaning machine, the combination of a plurality of shrimp holders movable through a predetermined path extending through a shell removing zone, means for supplying shrimp to a supply station along said path that is spaced from said shell removing zone, each of said holders including a pair of opposed tail gripping elements, means for effecting movement of the tail gripping elements of each holder toward each other to grip the tail of a shrimp as the holder moves through said supply station whereby the shrimp is pulled tail first onto the holder, each of said holders including means for gripping the main portion of the shell of a shrimp which is pulled onto the holder by said tail gripping elements thereof, a first pair of shell clutches carried by each holder for engagement with the shell of a shrimp on the holder near the tail of the shrimp, a second pair of shell clutches carried by each holder for engagement with the shell of a shrimp on the holder at positions between said first pair of clutches and the shrimp tail, means for engaging both pairs of clutches carried by each holder with the shell of a shrimp on the holder, means for moving said second pair of clutches for each holder away from said first pair of clutches for the holder and toward the tail of a shrimp on the holder after both pairs of clutches are engaged with the shrimp shell to break the strength of the shrimp shell at a position adjacent the tail of the shrimp, means for opening longitudinally the main portions of the shells of shrimp carried by said respective holders, flesh body and tail displacing means including a plurality of flesh body impaling tines, means supporting said displacing means for movement along a predetermined path which extends through said shell removing zone and which generally parallels within said zone movement of individual holders within said zone, drive means synchronized with movement of said holders and coacting with said flesh body and tail displacing means to move the latter into said zone in synchronism with movement of an individual holder into said zone to impale with said tines the flesh body of a shrimp carried into said zone by the holder, said drive means having an effective output velocity which is coordinated with the velocity of said holders so that said displacing means is moved through said zone in the same general direction as a coacting holder is moved through said zone but at a higher speed so that the flesh body of a shrimp engaged by said displacing means in said zone is released from the main portion of the shrimp shell gripped by the adjacent holder by longitudinal movement of the tail and impaled flesh body of the shrimp in relation to the shrimp shell longitudinally toward the tail end of the shrimp shell so that the main portion of the shrimp shell carried in the adjacent holder is displaced over the head end of the flesh body, and stripper means operated in timed relation to movement of said displacing means to remove from said tines flesh bodies with attached tails.

8. In a machine for cleaning shrimp, the combination of a holder movable along a predetermined path extending through a shell removing zone, said holder including means for gripping a shrimp along the main portion of the shrimp shell to carry the shrimp along said path, means for opening longitudinally the main portion of the shell of a shrimp carried by said holder, a flesh body displacing assembly, operating means synchronized with movement of said holder and coacting wtih said displacing assembly for moving said displacing assembly into engagement with the flesh body of a shrimp carried into said shell removing zone by said holder; said operating means being coordinated with said holder to effect in said zone movement of said displacing means relative to said holder, which relative movement has with respect to the position of a shrimp carried by the holder a longitudinal direction directed from the head end toward the tail end of said shrimp position, to release the flesh body and tail of the shrimp from the main shell portion carried by the holder; a flesh body slitting knife carried by said displacing assembly, and knife actuating means synchronized with said operating means for said displacing means and coacting with said knife to effect slitting of the flesh body of a shrimp by said knife immediately subsequent to release of the tail and flesh body of the shrimp from the main portion of the shrimp while the flesh body is still in close proximity to the main portion of the shrimp shell.

9. In a machine for cleaning shrimp, the combination of a shrimp holder movable along a predetermined path extending through a shell removing zone, said holder defining thereon an elongated shrimp body position for receiving the body of a shrimp, said holder being shaped and dimensioned to define a shrimp tail position located at a predetermined tail end of said shrimp body position to accommodate the tail of a shrimp the body of which is disposed in said shrimp body position, the end of said shrimp position opposite from said tail position being the head end of the shrimp position, said holder including shrimp shell gripping means for firmly gripping the shell of a shrimp along the portion thereof disposed in said shrimp body position, said shrimp shell gripping means being shaped and dimensioned to provide clearance for a shrimp tail in said shrimp tail position so that a shrimp tail in said shrimp tail position remains free of the grip of the shrimp shell gripping means, shell opening means for opening the shell of a shrimp longitudinally along the portion thereof disposed in said shrimp body position, shrimp tail and flesh body displacing means, operating means interconnected between said holder and said shrimp tail and flesh body displacing means for effecting relative movement of said holder and said displacing means in synchronism with movement of the holder into said shell removing zone to bring the displacing means into a proximate relation to said shrimp body position in which proximate relation the displacing means engages a shrimp flesh body in said shrimp body position; and said operating means including actuating means interconnected between said holder and said flesh body displacing means to effect, while the displacing means is in proximate relation to said holder in said shell removing zone, relative movement of the displacing means in relation to the holder in a direction directed generally from the head end toward the tail of said shrimp position on the holder so that the main portion of a shrimp shell disposed in said shrimp body position and gripped by said shrimp shell gripping means is displaced over the head end of the shrimp flesh body engaged by said displacing means.

10. In a machine for cleaning shrimp, the combination of a shrimp holder defining thereon an elongated shrimp body position for receiving the body of a shrimp, said holder being shaped and dimensioned to define a shrimp tail position located at a predetermined tail end of said shrimp body position to accommodate the tail of a shrimp the body of which is disposed in said shrimp body position, the end of said shrimp position opposite from said tail position being the head end of the shrimp position, said holder including shrimp shell gripping means for firmly gripping the shell of a shrimp along the portion thereof disposed in said shrimp body position, said shrimp shell gripping means being shaped and dimensioned to provide clearance for a shrimp tail in said shrimp tail position so that a shrimp tail in said shrimp tail position remains free of the grip of the shrimp shell gripping means, shrimp tail and flesh body displacing means, operating means interconnected between said holder and said shrimp tail and flesh body displacing means for effecting relative movement of said holder and said displacing means to bring the displacing means into a proximate relation to said shrimp body position in which proximate relation the displacing means engages a shrimp flesh body in said shrimp body position; and said operating means including actuating means interconnected between said holder and said flesh body displacing means to effect, while the displacing means is in proximate relation to said holder, relative movement of the displacing means in relation to the holder in a direction directed generally from the head end toward the tail of said shrimp position on the holder so that the main portion of a shrimp shell disposed in said shrimp body position and gripped by said shrimp shell gripping means is displaced over the head end of the shrimp flesh body engaged by said displacing means.

References Cited by the Examiner

UNITED STATES PATENTS

| 2,716,776 | 9/1955 | Streich et al. | 17—2 |
| 2,784,450 | 3/1957 | Jonsson | 17—45 |
| 2,850,761 | 9/1958 | Jonsson | 17—2 |
| 2,974,356 | 3/1961 | Cerny | 17—2 |
| 3,070,833 | 1/1963 | Skrmetta | 17—45 |
| 3,122,777 | 3/1964 | Jonsson | 17—2 |

SAMUEL KOREN, *Primary Examiner.*

LUCIE H. LAUNDENSLAGER, *Examiner.*